United States Patent
Disch et al.

(10) Patent No.: US 6,306,940 B1
(45) Date of Patent: Oct. 23, 2001

(54) COLORANT CONCENTRATES FOR DYEING POLYOXYMETHYLENE MOULDING MATERIALS

(75) Inventors: Stefan Disch, Frankfurt; Peter Eckardt, Hofheim; Michael Hoffmockel, Bad Soden; Karl-Friedrich Mück, Wiesbaden; Gerhard Reuschel, Liederbach, all of (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/600,945
(22) PCT Filed: Jan. 26, 1999
(86) PCT No.: PCT/EP99/00451
§ 371 Date: Jul. 25, 2000
§ 102(e) Date: Jul. 25, 2000
(87) PCT Pub. No.: WO99/37709
PCT Pub. Date: Jul. 29, 1999

(30) Foreign Application Priority Data

Jan. 27, 1998 (DE) .............................................. 198 03 227

(51) Int. Cl.[7] .......................... C08K 5/3492; C08K 5/16; C08K 5/06
(52) U.S. Cl. ............................ 524/100; 524/99; 524/102; 524/231; 524/252; 524/378; 524/400; 524/487; 524/515; 524/538; 524/612
(58) Field of Search ............................. 524/99, 102, 100, 524/231, 252, 378, 400, 487, 515, 538, 612

(56) References Cited

U.S. PATENT DOCUMENTS 3,637,575 * 1/1972 Fischer et al. ........................ 524/86
5,171,770 * 12/1992 Nakagawa .............................. 524/91

FOREIGN PATENT DOCUMENTS 1595644   4/1970  (DE) .
97/09381  3/1997  (WO) .

OTHER PUBLICATIONS

Komaki Mutsuo, *Pat. Abs. of Japan 17*: No. 113, Abstract of Japan 04–298572 (Oct. 22, 1992).

Murase Noritaka, *Pat Abs. of Japan 96*:No. 4, Abstract of Japan 07–331028 (Dec. 19, 1995).

Momoi Yasutaka, *Pat. Abs. of Japan 96*:No. 12, Abstract of Japan 08–208946 (Aug. 13, 1996).

\* cited by examiner

*Primary Examiner*—Kriellion A. Sanders
(74) *Attorney, Agent, or Firm*—Connolly Bove Lodge & Hutz LLP

(57) ABSTRACT

Colorant concentrates made from free-flowing polyoxymethylene copolymer as carrier, 15–80% by weight of colorant, 2–15% by weight of nitrogen-containing stabilizer and 0–15% by weight of dispersion aid for coloring pellets or molding compositions made from polyoxymethylene (POM) and for producing colored injection moldings or colored POM extrudates. The products produced with this colorant preparation are particularly stable during processing and have very low formaldehyde emissions.

20 Claims, No Drawings

COLORANT CONCENTRATES FOR DYEING POLYOXYMETHYLENE MOULDING MATERIALS

The present invention relates to colorant concentrates which are particularly suitable for coloring molding compositions made from polyoxymethylene (POM) and for producing colored injection moldings or colored POM extrudates. The resultant products are particularly stable during processing and have very low formaldehyde emissions.

The invention further relates to the use of the novel colorant concentrates for preparing colored POM pellets, POM molding compositions or POM moldings with low formaldehyde emission, and to the process associated therewith for preparing low-emission, colored POM materials and low-emission POM molding compositions which comprise appropriate proportions of the constituents of the novel colorant concentrates.

Since their introduction into the market about 30 years ago, polyoxymethylenes have become established as highly useful engineering plastics for a great many applications. POMs are particularly widely used as engineering plastics in automotive construction and in the electrical industry, as found in many examples in POM producers' technical service literature.

The advantageous properties of polyoxymethylenes means there is a requirement for their use to be extended to visible parts and for further application sectors to be opened up for the materials. However, for this it is frequently necessary for the material to be matched for visual purposes, i.e. color-matched. To this end, colorants in the form of pigments or polymer-soluble dyes are admixed with POM molding compositions.

Pigments and dyes are in most cases dusty and tend to clump and agglomerate and are therefore often not freeflowing. It is therefore very costly to incorporate pure colorants uniformly into plastics. To achieve uniform perceived color, however, uniform distribution of the colorant in the plastic is particularly important. It can be achieved by first mixing a high concentration of colorant into polymeric carriers, usually with addition of dispersion aids. The resultant colorant preparation, also termed masterbatch or colorant concentrate, is then admixed with the plastic to be colored in order finally to achieve the desired perceived color.

Now it is well known (Damm, W. and Herrmann, E., in Gächter, Müller; 3rd edition, 1989, p. 730) that specifically POM is particularly difficult to color. This material is highly sensitive to foreign substances, particularly if these contain acid or have acid groups, as is often the case with colorants. This means that degradation of the material, leading to release of formaldehyde, can occur during processing, and this severely impairs the usefulness of the material for producing moldings. For these reasons it has hitherto been possible to use only a limited number of colorants for pigmenting POM without adverse effect on the properties of the material or of the product. To suppress degradation of the material in POM molding compositions use is usually made of stabilizers. Effective stabilization is particularly important in colored POM molding compositions.

Attempts have long been made to circumvent these disadvantages. JP-07053770 describes how pigments are incorporated into a polyolefin carrier using long-chain primary alcohols, to obtain a color concentrate for coloring a wide variety of commercial polymers. Many other texts (JP-02281046, U.S. Pat. Nos. 4,810,733, 4,624,983, JP-60086155) also describe the use of polyolefins as carrier for pigments.

JP-08208946 adds dicyandiamide as stabilizer to a colored polyacetal molding composition. This reduces formaldehyde odor during injection molding with no loss of physical properties.

JP-04077528 describes the use of POM as carrier material for pigments. This mixture also has admixed nylon-6 and boric esters as dispersing agents. KR-9308188 describes the use of POM as a carrier for conductivity black.

Although, as stated above, the use of POM as carrier material for pigments is already known, the current problem of chemical instability followed by formaldehyde liberation during processing and from moldings has hitherto not been adequately solved. The customary colorant concentrates used hitherto do not reliably produce low-emission moldings.

There was therefore a need to develop POM molding compositions in which firstly the colorant has very good dispersion and secondly there is a significant reduction in the formaldehyde emissions hitherto found from these compositions.

The object is achieved by colorant concentrates which comprise POM as carrier material and stabilizers and, if desired, dispersion aids, as well as the necessary colorants.

The novel colorant concentrates are composed of freeflowing POM copolymer as carrier for 15–80% by weight, preferably 20–60% by weight, particularly preferably 20–45% by weight, of colorant, 2–15% by weight, preferably 2–10% by weight, particularly preferably 4–10% by weight, of nitrogen-containing stabilizer and 0–15% by weight, preferably 0–10% by weight, particularly preferably 3–5% by weight, of dispersion aids. The POM here may also comprise other customary additives, such as UV stabilizers etc. The % by weight data here are based on 100% by weight of colorant preparation.

The free-flowing POM copolymer used according to the invention comprises an oxymethylene copolymer which generally contains 0.6–15 mol %, preferably 0.8–12 mol % and particularly preferably 1–10 mol % of oxyethylene units as comonomer units in the POM copolymer and has an MFR of 9–50 g/10 min, preferably 13–35 g/10 min and particularly preferably 25–35 g/10 min. The number-average molar mass Mn determined by GPC is at least 5000 g/mol, generally 30,000–70,000 g/mol and preferably 45,000–65,000 g/mol. A mixture of different polyoxymethylene copolymers of differing compositions may also be used instead of a single POM copolymer.

The colorants used may be any desired inorganic pigments, such as titanium dioxide, ultramarine blue, cobalt blue and other, organic pigments and dyes, such as phthalocyanines, anthraquinones and others, or carbon black, either individually or as a mixture or together with polymer-soluble dyes. Surprisingly and specifically, using the colorant preparation with its composition according to the invention means that the selection of colorants is no longer restricted to those hitherto particularly suitable for POM.

Particularly advantageous nitrogen-containing stabilizers are triamino-1,3,5-triazine and its derivatives, aliphatic diamines, among which the secondary diamines are preferred, piperidine derivatives, including polymeric forms, preferably 2,2,6,6-tetramethylpiperidine derivatives, melamine-formaldehyde condensates, polyamides, dicyan diamide, allantoin and its derivatives, and also hydantoin and its derivatives, individually or in combination.

Dispersion aids which may be used, individually or in combination, are polyalkylene oxides, such as polyethylene glycol (PEG), alkali-metal or alkaline-earth-metal salts or salts of other bivalent metal ions, such as $Zn^{2+}$, of long-chain fatty acids, such as stearates, laurates, oleates, behenates, montanates and palmitates, and also amide waxes, montan waxes or olefin waxes. Preferred dispersion aids here are high-molecular-weight polyalkylene oxides, in particular polyethylene glycol with a molecular weight above 25,000, amide waxes, montan waxes or olefin waxes, and also the stearates or hydroxystearates of magnesium or of calcium.

The novel colorant concentrates may be prepared simply by mixing the components. The colorant concentrates may then be incorporated into POM molding compositions by the general customary and known processes, such as pelletizing, extrusion, kneading, etc. The proportion of the colorant concentrate in the colored POM molding here depends on the color intensity of the colorant selected and on the perceived color desired. In principle any mixing ratio is possible.

It is also possible for the appropriate proportions of the constituents of the novel colorant concentrates, i.e. the colorants, the stabilizer and, if present, the dispersion aid, to be incorporated directly into POM molding compositions. Colored molding compositions prepared in this way have better stability and markedly lower formaldehyde emission than known POM molding compositions.

The invention therefore also provides polyoxymethylene molding compositions which comprise 0.2–1.5% by weight of colorant, 0.02–0.3 by weight of nitrogen-containing stabilizer and 0.05–0.75% by weight of dispersion aid.

However, it is particularly advantageous for the novel colorant concentrates to be used as a masterbatch for coloring pellets or molding compositions made from POM. Moldings produced therefrom have the lowest formaldehyde emission when compared to products currently commercially available. It is particularly surprising here that when the novel colorant concentrates are used the formaldehyde emission from colored POM moldings is considerably lower even than the formaldehyde emission from POM moldings into which comparable proportions of colorant, stabilizer and dispersion aid have been incorporated directly.

EXAMPLES

The following pigment mixtures were used in the examples:

Pigment mixture (1): composed of 53% by weight of titanium dioxide, 39% by weight of Renol black, 6.3% by weight of titan orange and 1.7% by weight of ekea red.

Pigment mixture (2): composed of 69.4% by weight of titanium dioxide, 14.8% by weight of Renol black, 14.2% by weight of titan orange and 1.6% by weight of Renol brown.

The commercially available POM copolymer used comprised ®Hostaform from Ticona GmbH, Frankfurt, Germany.

Example 1

Commercially available UV-stabilized POM copolymer was mixed with a novel color masterbatch in a weight ratio of 24:1. This mixture was used to injection mold sheets of wall thickness 1 mm. The formaldehyde emission from these sheets was determined after 24 h of storage using the test specification VDA 275. The masterbatch had the following composition:

25% by weight of pigment mixture (1)
5% by weight of melamine
5% by weight of polyethylene glycol of molecular weight 35,000
65% by weight of POM copolymer with an MFR of 28 g/10 min.

The emission value of the injection molded sheets was 9.7 mg/kg.

Comparative Example 1

Commercially available UV-stabilized POM copolymer was mixed with a color masterbatch of the type currently customary in a weight ratio of 24:1. As in Example 1, this mixture was used to injection mold sheets of wall thickness 1 mm, and the formaldehyde emission from these sheets was determined after 24 h of storage. The masterbatch has the following composition:

25% by weight of pigment mixture (1)
0.5% by weight of sterically hindered phenol
0.5% by weight of calcium citrate
74% by weight of POM copolymer with an MFR of 28 g/10 min.

The emission value of the injection molded sheets was 300 mg/kg.

Example 2

Commercially available UV-stabilized POM copolymer was mixed with a novel color masterbatch in a weight ratio of 29:1. As in Example 1, this mixture was used to injection mold sheets of wall thickness 1 mm, and the formaldehyde emission from these sheets was determined after 24 h of storage. The masterbatch had the following composition:

30% by weight of pigment mixture (2)
8% by weight of polyethylene glycol of molecular weight 35,000
2% by weight of magnesium stearate
5% by weight of allantoin
55% by weight of POM copolymer with an MFR of 27 g/10 min.

The emission value of the injection molded sheets was 3.0 mg/kg.

Comparative Example 2a 0.94% by weight of pigment mixture (2) was incorporated into commercially available UV-stabilized POM copolymer by pelletization. As in Example 1, the resultant pellets were used to produce sheets of wall thickness 1 mm, the formaldehyde emission from which was determined after 24 h of storage. The emission value of the injection molded sheets was 202 mg/kg.

Comparative Example 2b

The following additives were incorporated into commercially available UV-stabilized POM copolymer by pelletization:

0.94% by weight of pigment mixture (2)
0.27% by weight of polyethylene glycol of molecular weight 35,000
0.07% by weight of magnesium stearate
0.17% by weight of allantoin.

As in Example 1, the resultant pellets were used to produce sheets of wall thickness 1 mm, and the formaldehyde emission from these was determined after 24 h of storage. The emission value of the injection molded sheets was 25 mg/kg.

Example 3

Commercially available UV-stabilized POM copolymer was mixed with a novel color masterbatch in a weight ratio of 29:1. As in Example 1, this mixture was used to produce sheets of wall thickness 1 mm, and the formaldehyde emission from these was determined after 24 h of storage. The masterbatch had the following composition:

60% by weight of pigment mixture (2)

10% by weight of polyethylene glycol of molecular weight 35,000

4% by weight of allantoin

26% by weight of POM copolymer with an MFR of 30 g/10 min.

The emission value of the injection molded sheets was 8.4 mg/kg.

Example 4

Commercially available UV-stabilized POM copolymer was mixed with a novel color masterbatch in a weight ratio of 29:1. As in Example 1, this mixture was used to produce sheets of wall thickness 1 mm, and the formaldehyde emission from these was determined after 24 h of storage. The masterbatch had the following composition:

60% by weight of pigment mixture (2)

6% by weight of magnesium stearate

4% by weight of allantoin

30% by weight of POM copolymer with an MFR of 27 g/10 min.

The emission value of the injection molded sheets was 6.2 mg/kg.

What is claimed is:

1. A colorant concentrate for preparing polyoxymethylene molding compsotions with reduced formaldehyde emission, made from 15–80% by weight of colorant selected from the group consisting of carbon black, inorganic pigments and organic pigments, 2–15% by weight, of a nitrogen-containing stabilizer, 0–15% by weight of dispersion aid, and to make up 100% by weight of colorant preparation, free-flowing polyoxymethylene copolymer which may, if desired, also comprise UV stabilizers and other customary additives.

2. A colorant concentrate as claimed in claim 1, wherein the free-flowing polyoxymethylene copolymer has 0.6–15 mol % of oxyethylene units as comonomer units and has an MFR of 9–50 g/10 min.

3. A colorant concentrate as claimed in claim 1, wherein the nitrogen-containing stabilizer used comprises, individually or in combination, triaminotriazine or a derivative thereof, aliphatic diamines, piperidine derivatives, including polymeric forms, dicyan diamide, allantoin, hydantoin, melamine-formaldehyde condensate or a polyamide.

4. A colorant concentrate as claimed in claim 1, wherein the dispersion aid used comprises, individually or in combination, high-molecular-weight polyoxyalkylene, amide wax, olefin wax, montan wax or a zinc, alkali-metal or alkaline-earth-metal salt of long-chain fatty acids.

5. A colorant concentrate as claimed in claim 4, wherein the dispersion aid used comprises, individually or mixed, high-molecular-weight polyethylene glycol, magnesium stearate, magnesium hydroxystearate, calcium stearate or calcium hydroxystearate.

6. A colorant concentrate as claimed in claim 1, wherein the colorant used comprises, individually or mixed with other colorants, titanium dioxide, titan orange, ultramarine blue, cobalt blue, ekea red, Renol black, Renol brown, a phthalocyanine or an anthraquinone.

7. A process for producing colored polyoxymethylene moldings with reduced formaldehyde emission, which comprises incorporating a colorant concentrate as claimed in claim 1 into pellets or into a molding composition made from polyoxymethylene, and producing a molding therefrom, and the molding having reduced formaldehyde emission.

8. A method of using a colorant concentrate for producing colored polyoxymethylene pellets, polyoxymethylene molding compsotions or polyoxymethylene moldings which comprises incorporating a colorant concentrate as claimed in claim 1 into pellets or into a molding composition made from polyoxymethylene and producing a molding therefrom, and the molding having a reduce formaldehyde emission.

9. A polyoxymethylene molding composition comprising 0.02–1.5% by weight of colorant, 0.02–0.3% by weight of nitrogen-containing stabilizer and 0.05–0.75% by weight of dispersion aid.

10. A colorant concentrate for preparing polyoxymethylene molding compositions with reduced formaldehyde emission, made from 20–80% by weight of colorant selected from the group consisting of carbon black, inorganic pigments and organic pigments, 2–10% by weight of a nitrogen-containing stabilizer, 0–10% by weight of dispersion aid and to make up 100% by weight of colorant preparation, free-flowing polyoxymethylene copolymer which may, if desired, also comprise UV stabilizers and other customary additives.

11. A colorant concentrate as claimed in claim 10, wherein the free flowing polyoxymethylene copolymer has a 0.6–15 mol % of oxyethylene units as comonomer units and has an MFR of 9–50 g/10 min.

12. A colorant concentrate as claimed in claim 10, wherein the nitrogen-containing stabilizer used comprises, individually or in combination, triaminotriazine or a derivative thereof, aliphatic diamines, piperidine derivatives, including polymeric forms, dicyan diamide, allantoin, hydantoin, melamine-formaldehyde condensate or a polyamide.

13. A colorant concentrate as claimed in claim 10, wherein the dispersion aid used comprises, individually or in combination, high-molecular-weight polyoxyalkylene, amide wax, olefin wax, montan wax or a zinc, alkali-metal or alkaline-earth-metal salt of long-chain fatty acids.

14. A colorant concentrate as claimed in claim 13, wherein the dispersion aid used comprises, individually or mixed, high-molecular-weight polyethylene glycol, magnesium stearate, magnesium hydroxystearate, calcium stearate or calcium hydroxystearate.

15. A colorant concentrate as claimed in claim 10, wherein the colorant used comprises, individually or mixed with other colorants, titanium dioxide, titan orange, ultramarine blue, cobalt blue, ekea red, Renol black, Renol brown, a phthalocyanine.

16. A colorant concentrate for preparing polyoxymethylene molding compositions with reduced formaldehyde emission, made from 20–45% by weight of colorant selected from the group consisting of carbon black, inorganic pigments and organic pigments, 4–10% by weight of a nitrogen-containing stabilizer, 3–5% by weight of dispersion aid and to make up 100% by weight of colorant preparation, free-flowing polyoxymethylene copolymer which may, if desired, also comprise UV stabilizers and other customary additives.

17. A colorant concentrate as claimed in claim 16, wherein the free flowing polyoxymethylene copolymer has a 0.6–15 mol % of oxyethylene units as comonomer units and has an MFR of 9–50 g/10 min.

18. A colorant concentrate as claimed in claim 16, wherein the nitrogen-containing stabilizer used comprises, individually or in combination, triaminotriazine or a derivative thereof, aliphatic diamines, piperidine derivatives, including polymeric forms, dicyan diamide, allantoin, hydantoin, melamine-formaldehyde condensate or a polyamide.

19. A colorant concentrate as claimed in claim 16, wherein the dispersion aid used comprises, individually or in combination, high-molecular-weight polyoxyalkylene, amide wax, olefin wax, montan wax or a zinc, alkali-metal or alkaline-earth-metal salt of long-chain fatty acids.

20. A colorant concentrate as claimed in claim 19, wherein the dispersion aid used comprises, individually or mixed, high-molecular-weight polyethylene glycol, magnesium stearate, magnesium hydroxystearate, calcium stearate or calcium hydroxystearate.

* * * * *